(12) United States Patent
Hochstetler et al.

(10) Patent No.: US 10,644,563 B2
(45) Date of Patent: May 5, 2020

(54) TERMINAL LEAD ASSEMBLY FOR USE IN INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 107 days.

(21) Appl. No.: 15/862,141

(22) Filed: Jan. 4, 2018

(65) Prior Publication Data
US 2019/0207467 A1 Jul. 4, 2019

(51) Int. Cl.
*H02K 5/22* (2006.01)
*H02K 7/18* (2006.01)
*H02K 7/116* (2006.01)
*H02K 15/00* (2006.01)
*H02K 15/14* (2006.01)
(Continued)

(52) U.S. Cl.
CPC ............ *H02K 5/225* (2013.01); *H01R 11/05* (2013.01); *H02K 7/116* (2013.01); *H02K 15/0006* (2013.01); *H02K 15/0062* (2013.01); *H02K 15/14* (2013.01); *B64C 1/00* (2013.01); *B64D 1/00* (2013.01); *H01R 4/02* (2013.01); *H01R 9/24* (2013.01); *H01R 2201/26* (2013.01); *H02K 7/1823* (2013.01); *H02K 2203/06* (2013.01); *H02K 2213/03* (2013.01)

(58) Field of Classification Search
CPC .... H02K 5/225; H02K 15/0006; H02K 7/116; H02K 7/1823; H02K 15/14; H02K 15/0062; H02K 2213/03; H02K 2203/06; H01R 11/05; H01R 2201/26; H01R 9/24; H01R 4/02; B64D 1/00; B64C 1/00
USPC .......................................................... 310/71
See application file for complete search history.

(56) References Cited

U.S. PATENT DOCUMENTS 2,507,242 A * 5/1950 Bost ....................... H02K 5/225
439/49
5,989,073 A * 11/1999 Kahoun ............... H01R 9/2491
439/651
(Continued)

FOREIGN PATENT DOCUMENTS

DE  102013212233  12/2014
EP  2793374        10/2014

OTHER PUBLICATIONS

The Extended European Search Report for EP Application No. 19150222.8, dated May 13, 2019.

*Primary Examiner* — John K Kim
(74) *Attorney, Agent, or Firm* — Carlson, Gaskey & Olds, P.C.

(57) ABSTRACT

A terminal lead assembly for use in an integrated drive generator has a body formed of a lead portion and a support portion. The lead portion is received within an aperture in the support portion. The support portion has an outer periphery defined within a plane extending perpendicularly to a central axis of the lead portion. The outer periphery includes two curved portions and straight side portions extending parallel to each other and connecting the curved portions. An integrated drive generator and a method are also disclosed.

4 Claims, 4 Drawing Sheets

(51) Int. Cl.
    *H01R 11/05*     (2006.01)
    *B64C 1/00*     (2006.01)
    *B64D 1/00*     (2006.01)
    *H01R 4/02*     (2006.01)
    *H01R 9/24*     (2006.01)

(56) References Cited

U.S. PATENT DOCUMENTS

| | | | | |
|---|---|---|---|---|
| 8,313,351 B2* | 11/2012 | Patel | ............ | H02K 5/225 439/709 |
| 8,435,071 B2* | 5/2013 | Grosskopf | ............ | H01R 9/223 439/113 |
| 2012/0049672 A1* | 3/2012 | Grosskopf | ............ | H01R 9/223 310/71 |
| 2012/0133224 A1* | 5/2012 | Grosskopf | ............ | H01R 9/24 310/71 |
| 2012/0190250 A1* | 7/2012 | Patel | ............ | H02K 5/225 439/709 |
| 2014/0306560 A1* | 10/2014 | Hochstetler | ............ | H02K 5/225 310/71 |
| 2016/0177770 A1* | 6/2016 | Adams | ............ | F01D 15/10 290/46 |
| 2019/0207467 A1* | 7/2019 | Hochstetler | ............ | H01R 11/05 |

\* cited by examiner

TERMINAL LEAD ASSEMBLY FOR USE IN INTEGRATED DRIVE GENERATOR

BACKGROUND

This application relates to a terminal lead assembly for the power output terminals of an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, various accessory systems, such as various pumps, are driven by the carrier of the differential through an accessory drive gear.

There is a terminal lead assembly for communicating with wires within the integrated drive generator and providing a connection to outer electric connections. The terminal lead assemblies face design challenges.

SUMMARY

A terminal lead assembly for use in an integrated drive generator has a body formed of a lead portion and a support portion. The lead portion is received within an aperture in the support portion. The support portion has an outer periphery defined within a plane extending perpendicularly to a central axis of the lead portion. The outer periphery includes two circular end portions and straight side portions extending parallel to each other and connecting the curved portions.

An integrated drive generator and a method are also disclosed.

These and other features may be best understood from the following drawings and specification.

DETAILED DESCRIPTION

Figure 1A:
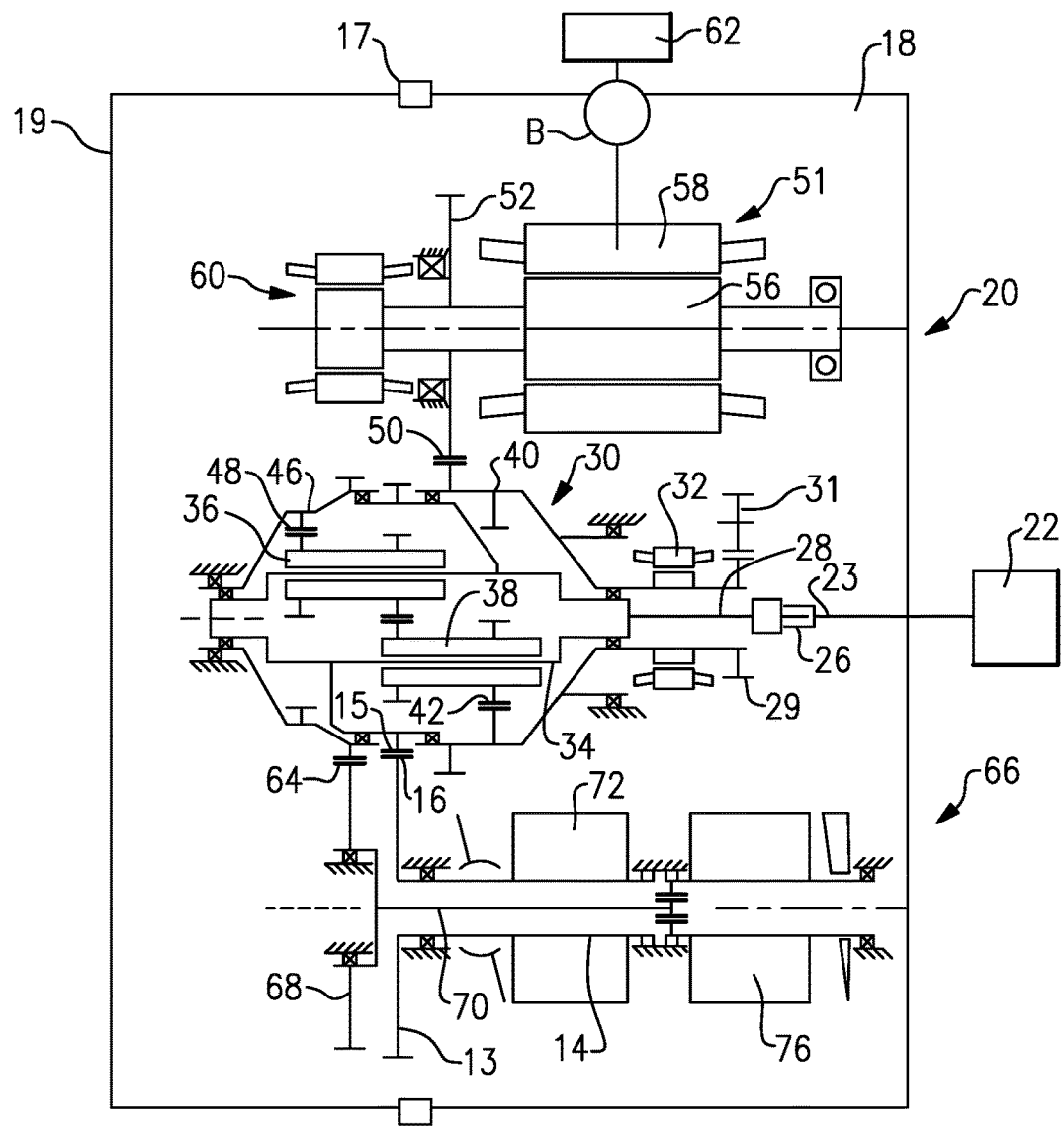
FIG. 1A schematically shows an integrated drive generator.

FIG. 1A shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and he speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with the carrier shaft 28 and drives a plurality of accessory gears 31.

The operation of the integrated drive generator 20 is generally as known in the art. A worker of ordinary skill would recognize that the desired frequency and speed at use 62 would dictate a number of design functions.

As can be appreciated, the power leaving the integrated drive generator 20 to the uses 62 must pass through a terminal at the area schematically shown at B.

Figure 1B:
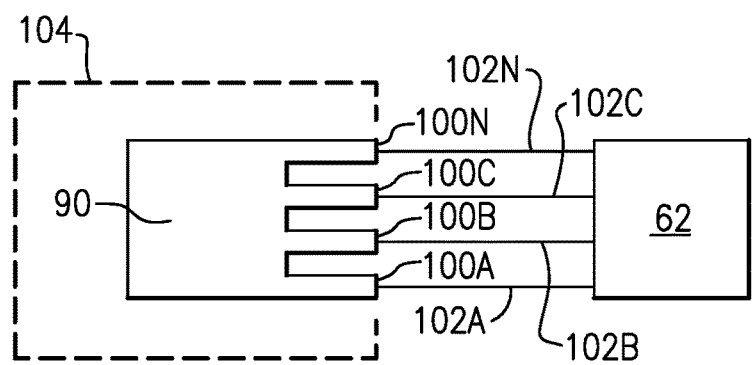
FIG. 1B shows a detail of the area B from FIG. 1A.

FIG. 1B schematically shows detail of the area B. As shown, an output terminal 90 has a plurality of discrete connections shown schematically here. Three phases of power are supplied from electrical connections 100A, 100B, and 100C. A neutral 100N is also included. A plurality of wires 102N, A, B and C connect to the uses 62. Thus, power is supplied to uses 62. A terminal block cover 104 is identified by a body 105 (FIGS. 2A-2E) and covers the connections 100A, 100B, 100C and 100N.

Figure 2A:
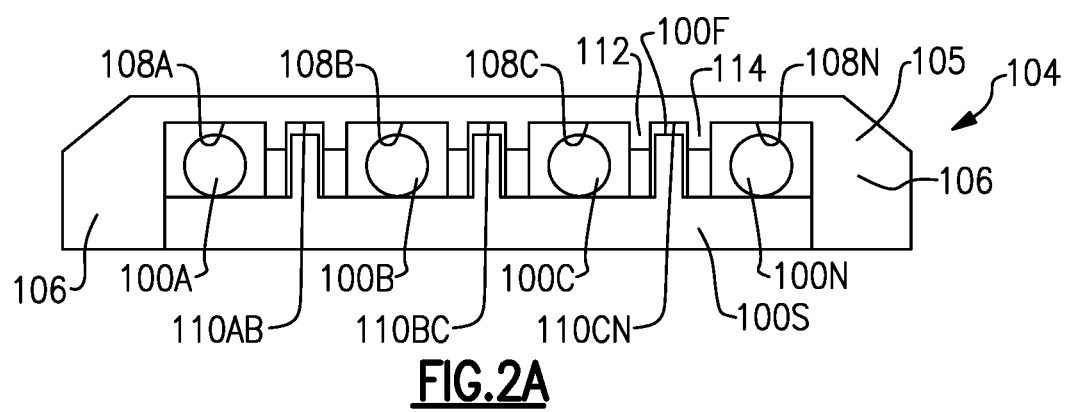
FIG. 2A shows a first detail of the FIG. 1B connection.

FIG. 2A shows the terminal block cover 104 having opposed thick ends 106 and intermediate connection channels 108A, 108B, 108C, and 108N for receiving the connections 100A, 100B, 100C, and 100N, respectively. Intermediate spacing channels 110AB, 110BC, and 110CN separate each of the connections to provide increased creep and lightning protection.

Figure 2B:
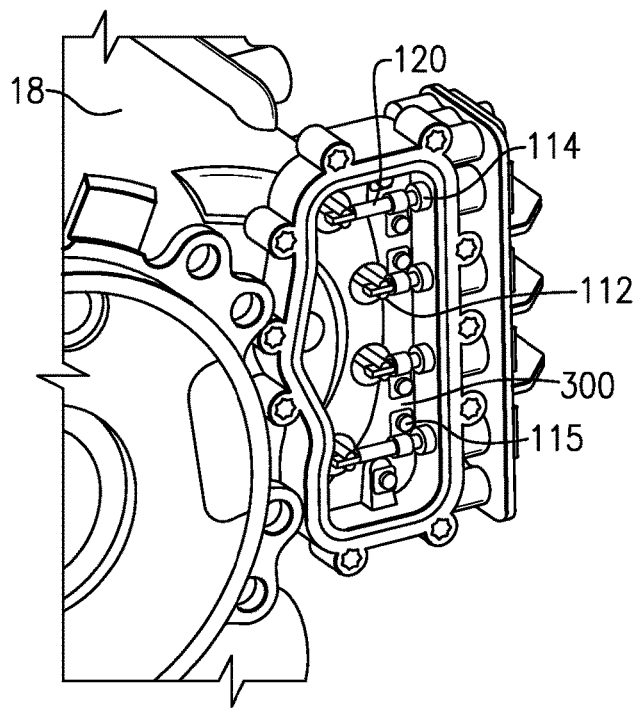
FIG. 2B shows further details.

A support, or terminal block 100, supports the connections 100A, B, C and N. Terminal block 100 has a support surface 100S with fingers 100F that extend into the spacing channels 110AB, 110BC, and 110CN, FIG. 2B is an assembly view showing the housing 18 with terminal block 100 and the terminal block cover 104 removed. Terminal lead assemblies 120 extend through holes in the terminal block, as will be explained below, and through holes 111 in the housing 18 to communicate with electrical connections 112A, 112B, 112C, and 112N, which extend from the generator.

An inner end of the terminal lead assemblies 120 is connected into the leads 112. A terminal support bracket 300 is also shown which includes clamps 115 to secure intermediate portions of the terminal lead assembly 120 to the housing 18.

Figure 2C:
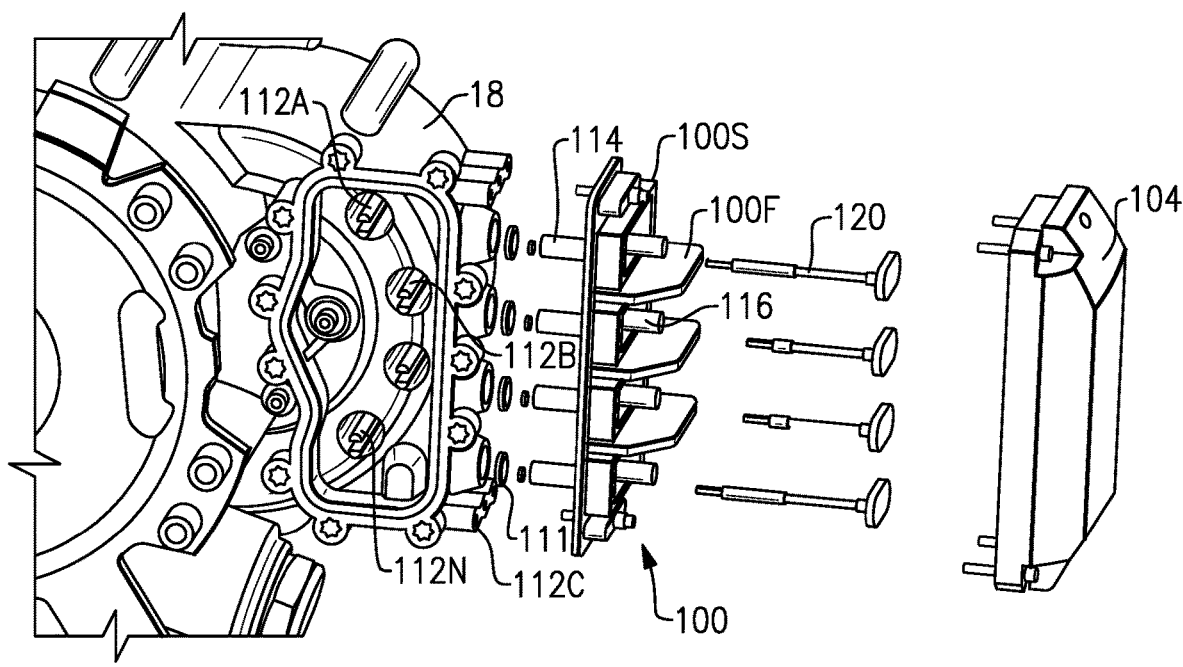
FIG. 2C shows further details.

FIG. 2C is an exploded view of some of the FIG. 2B components.

Figure 3A:
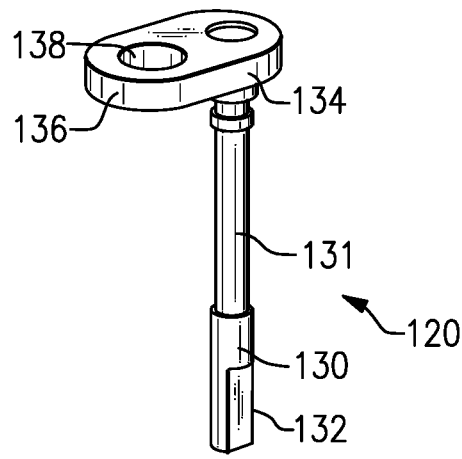
FIG. 3A shows a terminal lead assembly.

FIG. 3A shows the terminal lead assembly 120. A body 131 extends to a cylindrical inner portion 130 and flats 132. Flats 132 will connect into the leads 112, as described above. An outer support portion 134 has a hole 138 to be secured onto a guide or support structure on the terminal block 100. The outer periphery 136 of the member 134 is curved to remove sharp corners. This provides valuable benefits in reducing arc propensity during lightning strike and also improves creep resistance.

Figure 3B:
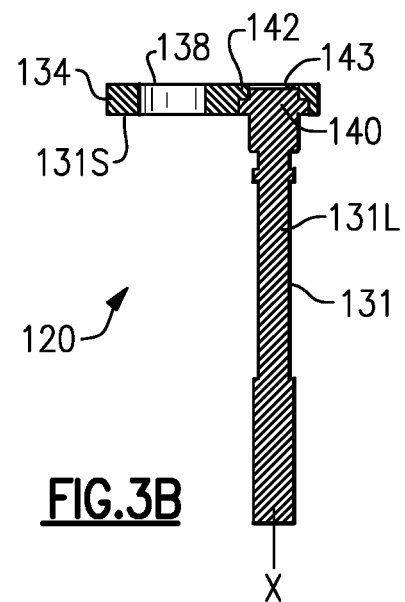
FIG. 3B shows a cross-section to a terminal lead assembly.

FIG. 3B shows that the terminal lead assembly 120 and, in particular, the body 131 includes two parts with a first lead portion 131L and the second support portion 131S. The support portion 131S receives the lead portion 131L through an opening 141. A braze connection 143 is provided.

Second support portion 131S is the surface against which the aircraft electrical feeders are clamped. Current is carried through the clamped interface to the aircraft.

Figure 3C:
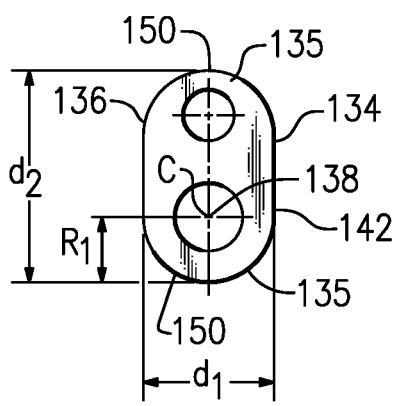
FIG. 3C shows a top view.

FIG. 3C shows details of the portion 134. This view is in a plane extending perpendicularly to a center axis X (see FIG. 3B) of the lead portion. As shown, a center of opening 138 defines a radius of curvature $R_1$ to define a curved end 135 at each end of the outer periphery 136. Straight sides 142 connect the two curved ends 135 to define the outer periphery 136. Straight sides 142 extend parallel to each other and are spaced by a distance $d_1$. A second distance $d_2$ is defined between outermost points 150 of the curved end 135. In embodiments $R_1$ was 0.405 inches (1.02223 centimeters), $d_1$ was 0.81 inches (2.057 centimeters), and $d_2$ was 1.306 inches (3.317 centimeters).

In embodiments, a ratio of $R_1$ to $d_1$ was between 0.40 and 0.60. A ratio of $R_1$ to $d_2$ was between 0.25 and 0.35, and a ratio of $d_1$ to $d_2$ was between 0.6 and 0.7. It should be understood that all of the above dimension come with a tolerance of +/−0.010 inch (0.025 centimeters).

A method of replacing a terminal lead assembly includes the steps of removing an existing terminal block cover from an integrated drive generator including an input shaft connected to a carrier shaft. The carrier shaft is connected into a gear differential and into a main generator. The main generator supplies three phases of electrical power to three electrical connections at a terminal connection. The existing terminal lead assembly provides connections. The existing terminal lead assembly is then replaced with a replacement terminal lead assembly, including a body formed of a lead portion and a support portion. The lead portion is received within an aperture in the support portion, which has an outer periphery defined within a plane extending perpendicularly to a central axis of the lead portion. The outer periphery includes two curved portions and straight side portions extending parallel to each other and connecting the curved portions.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A terminal lead assembly for use in an integrated drive generator comprising:

a body formed of a lead portion and a support portion, said lead portion received within an aperture in said support portion, and said support portion having an outer periphery defined within a plane extending perpendicularly to a central axis of said lead portion;

said outer periphery including two curved portions and straight side portions extending parallel to each other and connecting said curved portions;

wherein said straight side portions of said perimeter are spaced by a first distance, and points on said curved portions spaced furthest from each other are spaced by a second distance, and a ratio of said first distance to said second distance being between 0.6 and 0.7;

wherein a radius of curvature is defined to each of said curved portions from a center of a second aperture in said support portion, and a ratio of said radius of curvature to said second distance being between 0.25 and 0.35; and wherein a ratio of said radius of curvature to said first distance being between 0.40 and 0.60.

2. The terminal lead assembly as set forth in claim 1, wherein said lead portion is brazed to said support portion.

3. An integrated drive generator comprising:

a carrier shaft for driving a gear differential, and into a main generator, said main generator including a power output configured for providing three phases of electrical power to an outlet, and there being a terminal lead assembly;

said terminal lead assembly including a body formed of a lead portion and a support portion, said lead portion received within an aperture in said support portion, and said support portion having an outer periphery defined within a plane extending perpendicularly to a central axis of said lead portion; and said outer periphery including two curved portions and straight portions extending parallel to each other and connecting said curved portions;

wherein said straight side portions of said perimeter are spaced by a first distance, and points on said curved portions spaced furthest from each other are spaced by a second distance, and a ratio of said first distance to said second distance being between 0.6 and 0.7;

wherein a radius of curvature is defined to each of said circular end portions from a center of a second aperture in said support portion, and a ratio of said radius of curvature to said second distance being between 0.25 and 0.35; and wherein a ratio of said radius of curvature to said first distance being between 0.40 and 0.60.

4. The integrated drive generator as set forth in claim 3, wherein said lead portion is brazed to said support portion.

\* \* \* \* \*